(12) United States Patent
Igel et al.

(10) Patent No.: US 6,370,960 B1
(45) Date of Patent: Apr. 16, 2002

(54) CAPACITIVE SENSOR

(75) Inventors: Guenter Igel, Teningen; Ulrich Sieben, Reute; Juergen Giehl, Kirchzarten, all of (DE)

(73) Assignee: Micronas Internmetall GmbH (DE)

( * ) Notice: Subject to any disclaimer, the term of this patent is extended or adjusted under 35 U.S.C. 154(b) by 0 days.

(21) Appl. No.: 09/294,162

(22) Filed: Apr. 19, 1999

(30) Foreign Application Priority Data

Apr. 17, 1998 (DE) .......................................... 198 17 172

(51) Int. Cl.$^7$ ................................................ G01L 9/12
(52) U.S. Cl. .......................................... 73/724; 73/718
(58) Field of Search ................... 73/724, 718, 715, 73/754, 727; 361/283.4, 283

(56) References Cited

U.S. PATENT DOCUMENTS

| | | | | |
|---|---|---|---|---|
| 4,422,335 A | * | 12/1983 | Ohnesorge et al. | 73/724 |
| 4,426,673 A | * | 1/1984 | Bell et al. | 361/283 |
| 4,495,820 A | * | 1/1985 | Shimada et al. | 73/724 |
| 5,349,492 A | * | 9/1994 | Kimura et al. | 361/283.4 |
| 5,488,869 A | * | 2/1996 | Renaud | 73/724 |

FOREIGN PATENT DOCUMENTS

| | | |
|---|---|---|
| DE | 3310643 | 3/1983 |
| EP | 0455070 | 4/1991 |

OTHER PUBLICATIONS

Patent Abstract of Japan, 60-86413, (A) vol. 9/No. 232, P-389, Sep. 1985.

Bugg, et al., "Contributed Papers—Scanning Capacitance Microscopy", J.HYS., E: SCI. INSTRUM., No. 21, pp. 147–151, 1988.

Gevatter, et al., "Die Differential–Tunnelstrecke als hochauflosender Lageabweichungssensor", F & M 100, MIKROSYSTEMTECHNIK, pp. 571–573, 1992. (W/translation).

Matsumoto, et al., "Integrated silicon capacitive accelerometer with PLL servo/technique", Sensors and Actuators A, No. 39, pp. 209–217, 1993.

Schubert, "Beschleunigungssensoren in Silizium–Techniken," TEHNICHES Messen, No. 62, pp. 424–431, 1995 (w/translation).

Copy of Germany Search Report for 198 47 563.2–52, dated Mar. 3, 1999.

* cited by examiner

*Primary Examiner*—Benjamin R. Fuller
*Assistant Examiner*—Abdullahi Aw-Musse
(74) *Attorney, Agent, or Firm*—Arthur L. Plevy; Duane Morris LLP

(57) ABSTRACT

A capacitive sensor including a first electrode and a second electrode which are disposed opposite each other in spaced-apart relationship to form a capacitor, the first electrode being disposed on a first substrate and the second electrode on a second substrate, the substrates being joined together at the sides of the electrodes, and the second substrate forming, in the area of the second electrode, a diaphragm deformable by pressure. An electronic signal processing device for processing the measurement signals is incorporated in one of the substrates below the electrode disposed thereon.

19 Claims, 1 Drawing Sheet

CAPACITIVE SENSOR

FIELD OF THE INVENTION

This invention relates to sensors and more particularly to a capacitive sensor having a first electrode and a second electrode which are disposed opposite each other in spaced-apart relationship and form a capacitor, the first electrode being disposed on a first substrate and the second electrode on a second substrate, the substrates being joined together at the sides of the electrodes, and the second substrate forming, in the area of the second electrode, a diaphragm deformable by pressure.

BACKGROUND OF THE INVENTION

Such a sensor is disclosed in DE 33 10 643 and can be used for both absolute and relative pressure measurements. The output signals of the sensor can be applied via electrode terminals to an electronic signal processing device. The signal processing device is a system separate from the sensor.

It is the object of the invention to provide a capacitive sensor which has a better connection with the electronic signal processing device.

SUMMARY OF THE INVENTION

A sensor including: a capacitor including a first electrode disposed on a first substrate, and a second electrode disposed on a second substrate including a deformable diaphragm, wherein the first and second substrates are coupled together so as to space the first and second electrodes apart; and, an electronic signal processing device for processing measurement signals incorporated in at least one of the first and second substrates below either the first or second electrode disposed thereon.

DETAILED DESCRIPTION OF THE INVENTION

Figure 1:
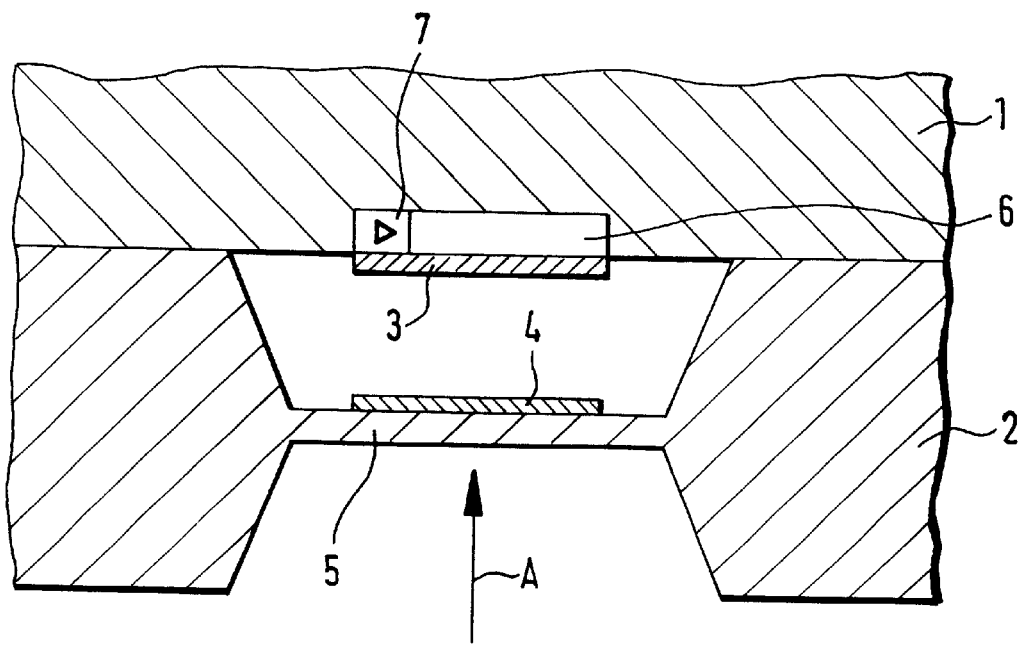
FIG. 1 illustrates a first embodiment of a capacitive sensor in accordance with the invention.

This object is attained by a sensor of the above kind in which an electronic signal processing device for processing the measurement signals is incorporated in at least one of the substrates below the electrode provided thereon. By this vertical integration of the capacitive sensor and the signal processing device, the space factor of the capacitive sensor is improved.

Since the packing density of the overall system of the capacitive sensor with the signal processing device is increased, the size of the overall system is reduced. Additionally, the paths for the measurement signals of the capacitive sensor are shortened, permitting a more interference-free and more accurate evaluation of the measured quantity. Usual quantities measured by the capacitive sensor are pressure, force, and acceleration.

In a preferred embodiment of the invention, the signal processing device is incorporated in the first substrate. This prevents the signal processing device from being influenced during the measurement by the deformation of the diaphragm.

The second substrate may contain at least one measuring device for measuring a physical quantity, permitting an additional evaluation of measured quantities during the actual measurement of the capacitive sensor via the electrodes. An additional evaluation or a redundant evaluation is thus possible. The measuring device may have a piezoresistive structure which is disposed at the side of the deformable diaphragm. It is also possible to provide two or more piezoresistive structures.

In another embodiment, a first portion of the signal processing device is incorporated in the first substrate, and a second portion in the second substrate. The signal processing device is thus divided between the two substrates, so that more elements can be accommodated in the signal processing device or a symmetrical arrangement can be achieved.

In a preferred embodiment of the invention, the signal processing device comprises signal-amplifying elements. Then the measurement signals are amplified in close proximity to the respective electrode, so that the unamplified measurement signal has to travel only a very short path. In another embodiment of the invention, at least one of the electrodes is formed from a portion of a conductor track of the signal processing device. This has the advantage that no additional level of metallization is necessary to form the corresponding electrode. The portion of the conductor track then serves different functions: in one state, during a measurement, it is used as an electrode, and in another state, in a period in which no measurement takes place, it is used as a conductor track for routing the measurement signal onward. A suitable switching element or a switching device must be provided for switching between the two states.

In a further embodiment of the invention, at least one of the electrodes is patterned for a spatially resolved measurement. This makes it possible to measure deformations of the sensor diaphragm, for example. The electrode can be formed from parallel, stripe-like elements. If the signal processing device comprises elements for spatially resolved measurements, an additional evaluation can be performed.

Advantageously, the sensor is formed from a semiconductor material, particularly from silicon. Then the capacitive sensor and the integrated signal processing device are particularly easy to fabricate. Additionally, silicon has favorable mechanical properties for the formation of the diaphragms.

Referring now to the figures, wherein like references refer to like elements of the invention, FIG. 1 illustrates a capacitive sensor composed of a first substrate 1 and a second substrate 2. A first electrode 3 on the first substrate 1 and a second electrode 4 on the second substrate 2 are disposed opposite each other in spaced-apart relationship to form a capacitor. In the area of the second electrode 4, the second substrate 2 is shaped so as to form a diaphragm 5 which is deformable by pressure. The pressure is commonly applied to the diaphragm 5 in the direction of arrow A, whereby the diaphragm is correspondingly deformed. In the first substrate 1, an electronic signal processing device 6 for processing the measurement signals is incorporated below the first electrode 3. Through the integration of the signal processing device into the substrate directly at the electrode, the space available for the capacitive sensor is optimally utilized. The size of the overall system is reduced, since the signal processing device has to be neither disposed externally to the sensor nor integrated at the side of the capacitor. Additionally, the signal paths from the capacitor to the signal processing device are shortened considerably. This permits a particularly reliable evaluation of the measurement signals.

The signal processing device 6 further comprises signal-amplifying elements 7. Thus, the measurement signals can be amplified in close proximity to the sensing element. Very accurate and reliable measurement and evaluation are possible. With the signal processing device 6, the measurement signals can be processed and amplified; if necessary, they can also be used to control the sensor.

The capacitive sensor can be used as a pressure, force, or acceleration sensor. The diaphragm 5 is usually deformed by application of pressure or force in the direction of arrow A. As a result of the deformation of the diaphragm 5, the capacitance of the capacitor formed by the first and second electrodes 3, 4 changes. The evaluation is performed by the signal processing device 6.

In the embodiment chosen, the substrates 1, 2 are formed of silicon. This permits a particularly simple integration of the signal processing device 6. Additionally, silicon has favorable mechanical properties for the deformable diaphragm 5.

The first electrode 3 may be formed by at least one conductor track of the signal processing device 6. The conductor track is switched by a switching device (not shown) in such a way that it serves as an electrode during the measurement operation and as a conductor track between two successive measurement operations. In that case, no additional level of metallization is necessary to form the first electrode 3. The electrodes are then preferably made of aluminum, for example. It is also possible to use polysilicon or any other electrically conductive material.

Figure 2:
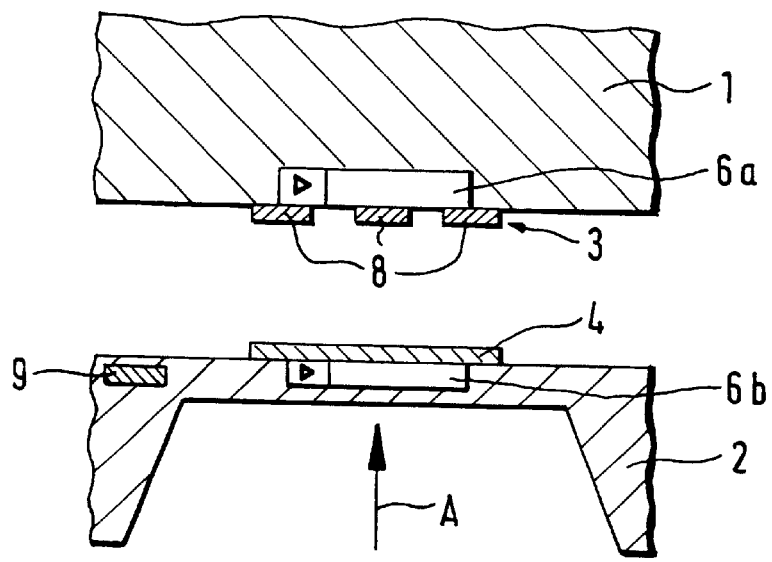
FIG. 2 illustrates a second embodiment of a capacitive sensor in accordance with the invention.

FIG. 2 shows another embodiment of the capacitive sensor. As the structure is basically the same as in FIG. 1, only the differences will be considered. Again, it should be remembered like parts have been designated by the same reference characters as in FIG. 1. The first electrode 3 is patterned to permit a spatially resolved measurement. It consists of stripe-like elements 8 extending parallel to each other. This makes it possible to detect the capacitance in a spatially resolved manner, so that locus-dependent sensing of deformations of the diaphragm 5 becomes possible. During the evaluation in the signal processing device, additional information can be supplied. The signal processing device is composed of two parts, the first part 6a being disposed in the first substrate 1 and the second part 6b in the second substrate 2. Each of the parts 6a, 6b is located below the electrode disposed on the respective substrate. The part 6a of the signal processing device comprises elements for processing the spatially resolved measurement. The evaluation of the spatially resolved measurement can thus be performed in close proximity to the spatially resolving electrode 3. The parts 6a, 6b of the signal processing device also comprise signal-amplifying elements, so that signal amplification can take place in proximity to the electrode. The second substrate 2 contains, at the side of the deformable diaphragm 5, a piezoresistive structure 9 with which additional measured values can be obtained which provide further information for the measurement by the sensor. Evaluation can be accomplished by means of a device in the area of the piezoresistive structure 9 or in the signal processing device 6, 6a, 6b.

The operation of the capacitive sensor will now be described with reference to FIG. 1. Pressure is applied to the diaphragm 5 of the sensor in the direction of arrow A. As a result, the diaphragm 5 is deformed. Due to the deformation, the distance between the first electrode 3 and the second electrode 4, and thus the capacitance of the capacitor formed by the electrodes 3, 4, changes. During the deformation of the diaphragm 5, the signal processing device 6 continuously receives and processes measurement signals. The measurement signals are first amplified and then subjected to a further evaluation process. The signal processing device 6 can process signals representative of pressure, of the force exerted on the sensor, or of the force caused by the acceleration. Since the first electrode 3 is used as a conductor track for the signal processing device 6, the electrode 3 is switched with a switching element in such a manner that it can be used alternately as a conductor track or as the first electrode 3 of the capacitor.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A capacitive sensor comprising a first electrode (3) and a second electrode (4) which are disposed opposite each other in spaced-apart relationship to form a capacitor, the first electrode (3) being disposed on a first substrate (1) and the second electrode (4) on a second substrate (2), the substrates (1, 2) being joined together, and the second substrate (2) including a pressure deformable diaphragm formed in an area of the second electrode (4), wherein an electronic signal processing device (6) for processing measurement signals is disposed in at least one of the substrates (1, 2) just below the electrode (3, 4) disposed thereon, and wherein at least one of the electrodes (3, 4) is formed by a portion of a conductor track of the signal processing device (6, 6a, 6b).

2. The sensor of claim 1, wherein the signal processing device (6) is disposed in the first substrate (1).

3. The sensor as claimed in claim 1, wherein a first portion (6a) of the signal processing device is disposed in the first substrate (1), and a second portion (6b) in the second substrate (2).

4. The sensor of claim 1, wherein the second substrate contains at least one measuring device for measuring a physical quantity.

5. The sensor of claim 4, wherein the measuring device is a piezoresistive structure located at the side of the deformable diaphragm.

6. The sensor of claim 1, wherein the signal processing device (6) comprises signal-amplifying means.

7. The sensor of claim 1, wherein at least one of the electrodes (3, 4) is patterned for a spatially resolved measurement.

8. The sensor of claim 7, wherein the at least one electrode (3, 4) comprises stripe-like elements (8) extending parallel to each other.

9. The sensor of claim 7, wherein the signal processing device (6) comprises elements for processing the spatially resolved measurement.

10. The sensor of claim 1, wherein the sensor is formed from a semiconductor material, particularly from silicon.

11. The sensor of claim 1, wherein the signal processing device is disposed in the first substrate.

12. The sensor as claimed in claim 1, wherein a first portion of the signal processing device is disposed in the first substrate, and a second portion in the second substrate.

13. The sensor of claim 1, wherein the second substrate further includes at least one piezoresistive device for measuring a physical quantity.

14. The sensor of claim 1, wherein the signal processing device comprises an amplifier.

15. A sensor comprising:
a first electrode disposed on a first substrate;
a second electrode disposed on a second substrate and positioned opposite said first electrode in a suitably spaced-apart relationship to form a capacitor, wherein the first and second substrates are joined together an the second substrate includes a deformable diaphragm formed in an area associated with the second electrode; and,
an electronic signal processing device for processing measurement signals said device disposed in at least one of said first and second substrates just below either said first or second electrode disposed thereon, wherein at least one of the electrodes is formed by a portion of a conductor track of the signal processing device.

16. The sensor of claim 15, wherein at least one of said first and second electrodes is patterned for a spatially resolved measurement.

17. The sensor of claim 15, wherein the at least one of said first and second electrodes comprises stripe-like elements extending parallel to each other.

18. A capacitive sensor comprising a first electrode (3) and a second electrode (4) which are disposed opposite each other in spaced-apart relationship to form a capacitor, the first electrode (3) being disposed on a first substrate (1) and the second electrode (4) on a second substrate (2), the substrates (1, 2) being joined together, and the second substrate (2) including a pressure deformable diaphragm filmed in an area of the second electrode (4), wherein an electronic signal processing device (6) for processing measurement signals is disposed in the substrates (1, 2) just below the electrodes (3, 4) disposed thereon, a first portion (6*a*) of the signal processing device being disposed in the first substrate (1), and a second portion (6*b*) in the second substrate (2), and wherein at least one of the electrodes (3, 4) is formed by a portion of a conductor track of the signal processing device (6, 6*a*, 6*b*).

19. A capacitive sensor comprising a first electrode (3) and a second electrode (4) which are disposed opposite each other in spaced-apart relationship to form a capacitor, the first electrode (3) being disposed on a first substrate (1) and the second electrode (4) on a second substrate (2), the substrates (1, 2) being joined together, and the second substrate (2) including a pressure deformable diaphragm formed in an area of the second electrode (4), wherein an electronic signal processing device (6) for processing measurement signals is disposed in at least one of the substrates (1, 2) just below the electrode (3, 4) disposed thereon, and wherein at least one of the electrodes (3, 4) is formed by a portion of a conductor track of the signal processing device (6, 6*a*, 6*b*), and wherein the second substrate contains at least one measuring device for measuring a physical quantity.

* * * * *